(12) United States Patent
Hou et al.

(10) Patent No.: US 9,977,520 B2
(45) Date of Patent: May 22, 2018

(54) STYLUS WITH CAPACITIVE SLIDE AND GRIP SENSORS

(71) Applicant: Adonit Co., Ltd., Taipei (TW)

(72) Inventors: Yu-Kuang Hou, Taipei (TW); Yueh-Hua Li, Taipei (TW); Yen-Teh Lee, Taipei (TW); Chien-Pang Lin, Taipei (TW); Yu-Ting Lo, Taipei (TW)

(73) Assignee: Adonit Co., Ltd., Taipei (TW)

( * ) Notice: Subject to any disclaimer, the term of this patent is extended or adjusted under 35 U.S.C. 154(b) by 0 days. days.

(21) Appl. No.: 15/217,969

(22) Filed: Jul. 22, 2016

(65) Prior Publication Data

US 2018/0024650 A1 Jan. 25, 2018

(51) Int. Cl.
| | |
|---|---|
| *G06F 3/03* | (2006.01) |
| *G06F 3/038* | (2013.01) |
| *G06F 3/044* | (2006.01) |
| *G06F 3/0354* | (2013.01) |
| *G06F 3/041* | (2006.01) |

(52) U.S. Cl.
CPC ........ *G06F 3/0383* (2013.01); *G06F 3/03545* (2013.01); *G06F 3/044* (2013.01); *G06F 3/0414* (2013.01); *G06F 2203/04106* (2013.01)

(58) Field of Classification Search
CPC . G06F 3/03545; G06F 3/04883; G06F 3/0317
USPC .......................................................... 345/179
See application file for complete search history.

(56) References Cited

U.S. PATENT DOCUMENTS

| | | | |
|---|---|---|---|
| 6,201,202 B1 * | 3/2001 | Katagiri | H01H 13/14 200/343 |
| 2006/0197754 A1 * | 9/2006 | Keely | G06F 3/03545 345/179 |
| 2010/0123675 A1 * | 5/2010 | Ippel | G06F 3/044 345/173 |
| 2013/0106766 A1 * | 5/2013 | Yilmaz | G06F 3/03545 345/174 |

* cited by examiner

Primary Examiner — Ram Mistry

(57) ABSTRACT

Embodiments of a stylus having a capacitive slide sensor and grip sensors are disclosed, for use with electronic devices and particularly with touchscreen devices. The stylus is in signal communication with the electronic device, either wired or wirelessly, and the slide sensor allows a user to generate a sliding data value as well as a contact/no-contact datum; these can be used as scaled control values or as buttonpress control values to control features of applications running on the electronic device. The capacitive sensors are formed on a single flexible PCB wrapped inside the stylus barrel.

10 Claims, 3 Drawing Sheets

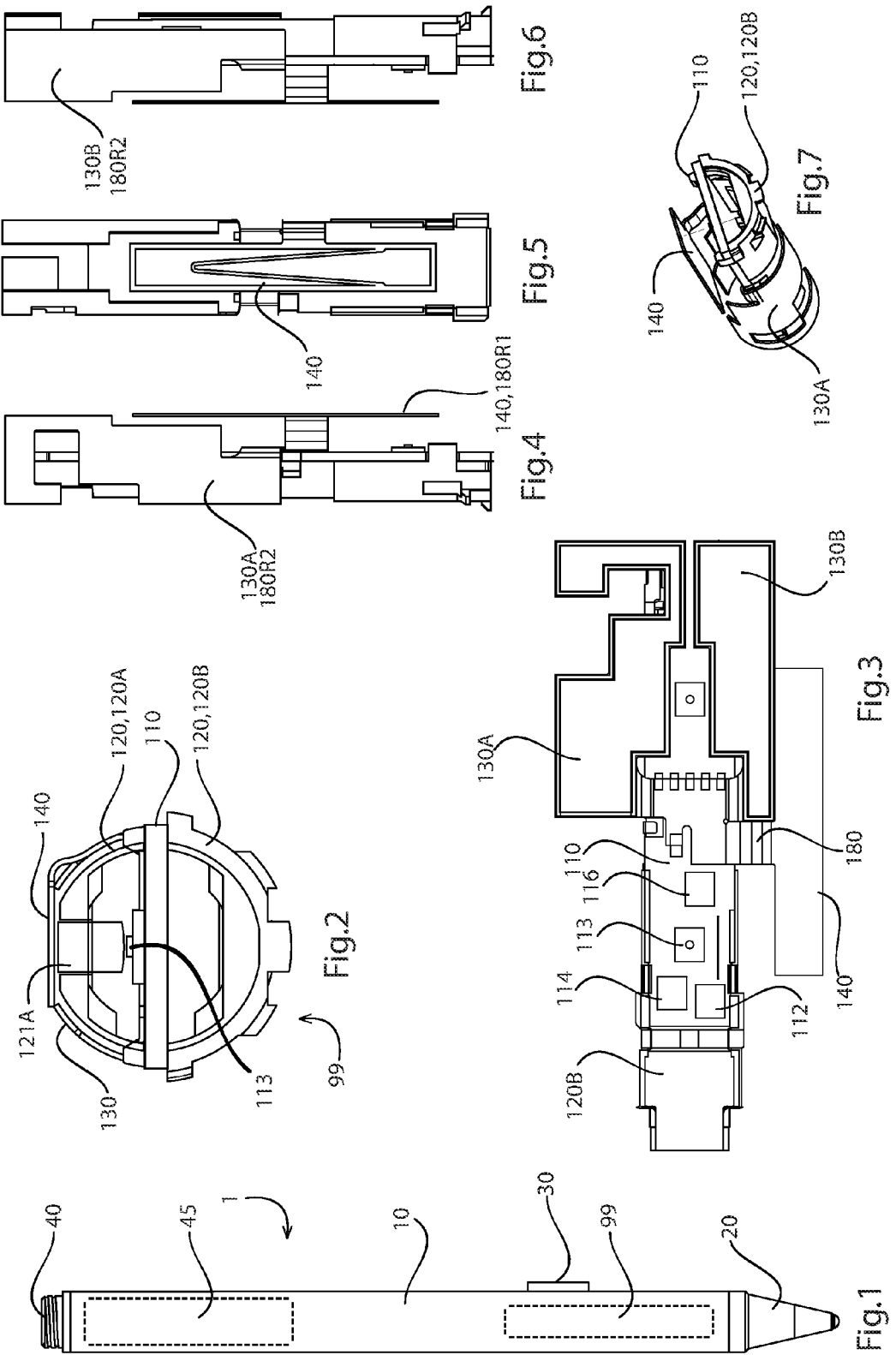

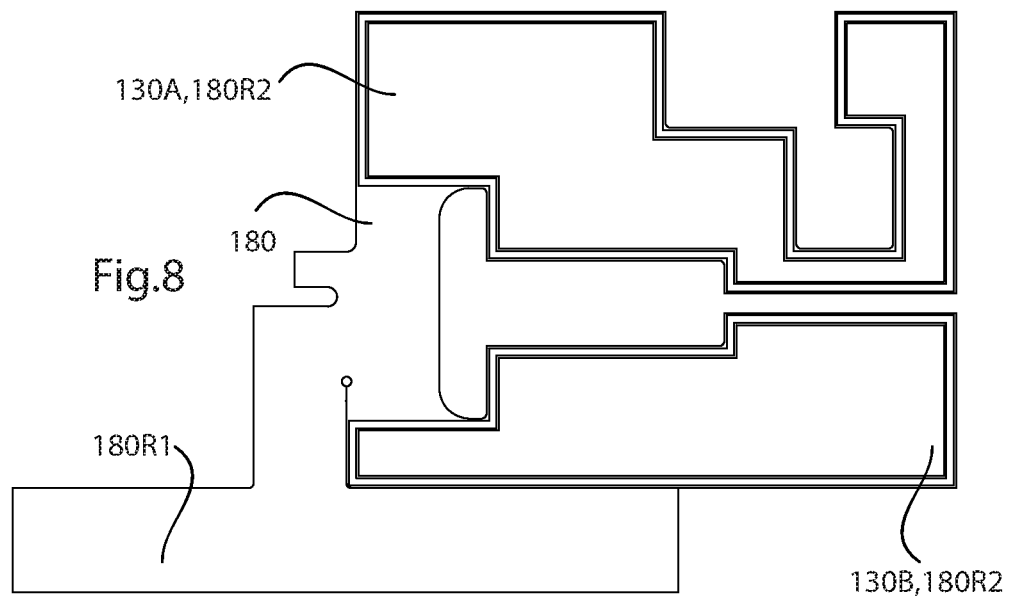
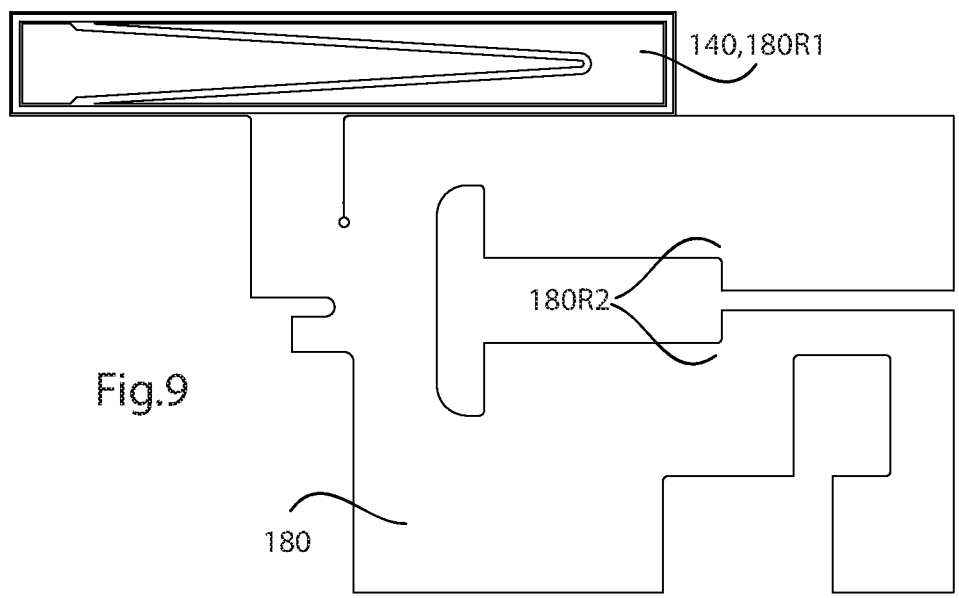

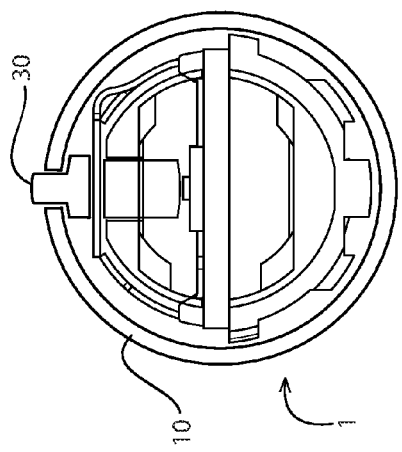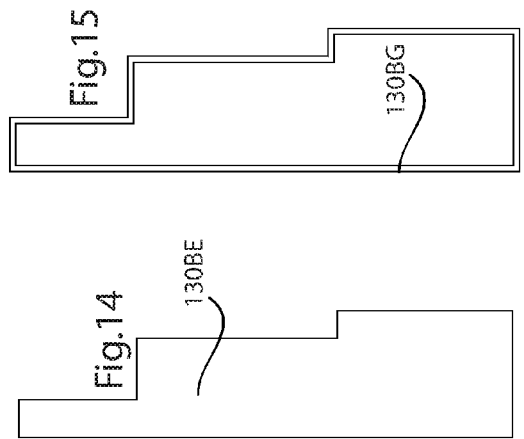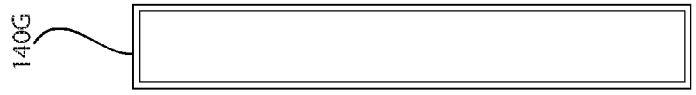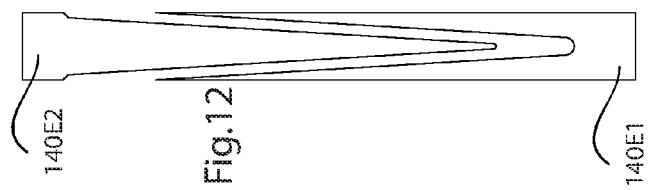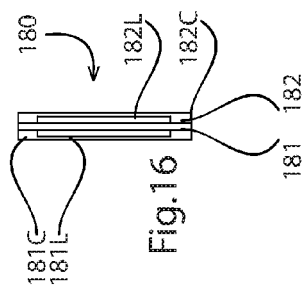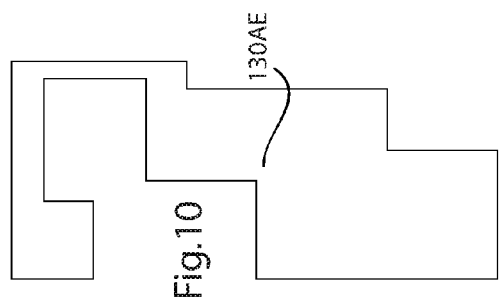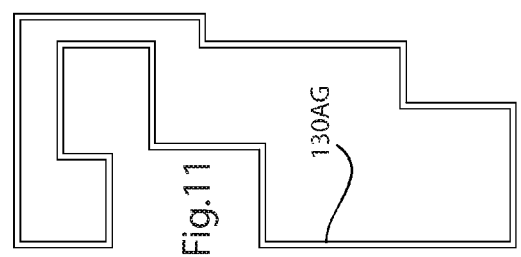

STYLUS WITH CAPACITIVE SLIDE AND GRIP SENSORS

FIELD OF THE DISCLOSURE

The disclosure relates to styluses, and more particularly to a stylus with a capacitive slide sensor for use with electronic devices such as those having a touchscreen

SUMMARY OF THE PRIOR ART

Touchscreen devices have become widespread as tablet computers and smartphones. These devices allow the user to manipulate the phone's user interface through a touch sensor that overlays their displays, allowing the user to touch the screen with an object to input a position or movement to the device. These touches may then be used by the operating system of the device to interpret gestures and selections that control the device's functions. The touch sensor replaces the mouse, trackball, and other pointer devices to control position sensing on the user interface.

These touchscreen devices may operate in a number of ways. Some require a dedicated stylus that must be used with the device at all times. This proves inconvenient, because the stylus may become lost or damaged, rendering the device partly useless until a new stylus is procured. As a result, touchscreen device manufacturers have moved to the use of touch sensors that can sense a human finger through capacitive sensing. Two major types of capacitive sensors are in use: mutual capacitance and self capacitance. Mutual capacitance has an advantage over self capacitance in that it allows for the tracking of multiple simultaneous touches. This allows for multi-touch gestures to be interpreted by the operating system, and so manufacturers have chosen to use mutual capacitance sensors in most modern devices. The mouse-replacement of the touch sensor is thus augmented beyond the capabilities of the computer mouse, which only generates a single position input.

However, the use of a finger creates its own issues for the end user, such as imprecise touch precision recognition and leaving skin oils and other contaminants on the screen. So, many users choose to use styluses that can be detected by the touchscreens to control their phones, with their fingers as a backup option when multi-touch gestures are necessary.

Styluses may further be in signal communication with an electronic device to transmit additional data to the electronic device, such as the force being applied to the stylus tip. Buttons may be added to the stylus, similar to mouse buttons, to allow additional user control as well as allowing the stylus to be powered on and off. Adding functionality and control features to styluses gives users an ability to augment the capabilities of their electronic devices for ease of use.

Improvements in stylus sensors are therefore desirable.

SUMMARY OF CERTAIN ASPECTS OF THE EMBODIMENTS

Embodiments described herein disclose a stylus for use with electronic devices such as touchscreen devices. Embodiments of the stylus have a capacitive slide sensor along the barrel (sometimes called the body or the housing) of the stylus, a control circuit, and a communications subcircuit so that the stylus may be in signal communication with an electronic device with which it is being used; communications may be either wired or wireless or both in different embodiments. Some embodiments have the slide sensor positioned in a grip area of the stylus barrel. Some embodiments position the slide sensor underneath a mechanical button or buttons located on a side of the stylus barrel. Some embodiments further comprise a second capacitive sensor that detects proximity of a capacitive target to the grip area. Some embodiments further comprise a three-axis accelerometer able to determine an orientation of the stylus. Some embodiments may further comprise other sensors, such as a force-sensing tip.

BRIEF DESCRIPTION OF THE DRAWINGS

FIG. 1 shows a plan view of an embodiment of a stylus having proximity and slide sensors;

FIG. 2 shows a sectional view of some interior components of a stylus having proximity and slide sensors;

FIG. 3 shows a top view of some interior components of a stylus having proximity and slide sensors, showing the layout of a first conductive layer of the flexible PCB;

FIG. 4 shows a left side view of some interior components of a stylus having proximity and slide sensors;

FIG. 5 shows a top view of some interior components of a stylus having proximity and slide sensors;

FIG. 6 shows a right side view of some interior components of a stylus having proximity and slide sensors;

FIG. 7 shows a perspective view of some interior components of a stylus having proximity and slide sensors;

FIG. 8 shows a flat view of a first side of a flexible PCB on which a slide sensor is formed;

FIG. 9 shows a flat view of a second side of a flexible PCB on which a plurality of proximity sensors are formed;

FIG. 10 shows a proximity sensor electrode;

FIG. 11 shows a proximity sensor ground electrode;

FIG. 12 shows an exploded view of a pair of electrodes for a slide sensor;

FIG. 13 shows a slide sensor ground electrode;

FIG. 14 shows a proximity sensor electrode;

FIG. 15 shows a proximity sensor ground electrode;

FIG. 16 shows an edge-on view of a flexible PCB; and

FIG. 17 shows a cross sectional view of some components of a stylus having proximity and slide sensors.

DETAILED DESCRIPTION OF THE EMBODIMENTS

The following detailed description of embodiments references the accompanying drawings that form a part hereof, and in which are shown by way of illustration various illustrative embodiments through which the invention may be practiced. The embodiments are described in sufficient detail to enable those skilled in the art to practice the invention, and it is to be understood that other embodiments may be utilized and that logical changes may be made without departing from the spirit and scope of the invention. The detailed description is, therefore, not to be taken in a limiting sense, and the scope of the invention is defined solely by the appended claims.

Please refer to FIG. 1, an embodiment of a stylus. Externally, the stylus 1 has a barrel 10, a tip 20, and a cosmetic button 30. In some embodiments, the tip 20 may be an active electronic stylus tip comprising a plurality of electrodes (as shown here); in some embodiments (not shown) the tip may be a disk tip or mesh tip or silicone tip. The stylus 1 may further have a charging port 40, which may in some embodiments (shown here) be located on the rear of the stylus; other embodiments (not shown) may charge through the stylus tip; still other embodiments (not shown)

may charge through the stylus barrel, for example by inductive charging. Shown in outline are a battery 45 and one possible general location of the components described in further detail below 99.

Referring now to FIGS. 2-7 and FIG. 17, internally, the stylus 1 comprises a circuit board 110, a chassis 120 which may in some embodiments be made of multiple parts such as upper chassis 120A and lower chassis 120B, one or more proximity sensors 130, and a slide sensor 140. The proximity and slide sensors may be attached to or formed upon a flexible PCB 180. The stylus 1 may also optionally comprise a force sensor (not shown) operatively coupled to the tip 20, a battery to power the circuit, a charger (typically as part of the circuit on circuit board 110) to recharge the battery, and electrical contact points (typically as part of the charging port 40) for supplying power to the charger.

In some embodiments, the circuit board 110 comprises a communication subcircuit 112 for example without limitation an RF communications chip for Bluetooth or WiFi. In some embodiments, the stylus may communicate over a wired connection such as a USB cable or dedicated cable.

The proximity sensor or sensors 130 and the slide sensor 140 detect the proximity of a target, for example but not limited to a finger of a user of the stylus, near a given sensor. The slide sensor 140 uses a pair of proximity sensors, each having a varied width, to sense a relative position of a target along the length of the slide sensor 140 and to output a single datum indicating the position; the datum output by the slide sensor 140 may in some embodiments also indicate lack of a touch and hence lack of a position. The proximity sensor or sensors 130 are single proximity sensors that vary an output datum according to a target's nearness and capacity; they may output a boolean datum indicating presence or absence of a target, or may output a datum indicating a level of proximity. The word "touch" is used to indicate the detection of a target in proximity to generate a proximity datum, which may then be output by a sensor. A touch "on" a sensor does not necessarily indicate physical contact with the sensor, but rather indicates that the presence of a target was sufficiently close to the sensor to cause the sensor to detect proximity; this typically results in the generation of a datum indicating proximity which is then output by the sensor subsystem.

Where a plurality of proximity sensors 130, such as proximity sensor 130A and proximity sensor 130B of FIG. 3, are used, in some embodiments they may be independent of each other and generate a datum for each proximity sensor; in some embodiments they may be unitary and generate a single datum for whether at least one proximity sensor senses proximity; in some embodiments they may be unitary and generate a single datum only if all proximity sensors sense proximity.

In a battery powered stylus 1, the proximity sensor or sensors 130 may be used for saving power by keeping the stylus 1 in a low-power or standby mode when the proximity sensor or sensors 130 does not detect proximity, i.e., when the stylus is not being held by a user. In embodiments where a plurality of proximity sensors are used, the low-power mode may be entered into in some embodiments only when all proximity sensors do not detect proximity, while in other embodiments the low-power mode may be entered into when one or more proximity sensors do not detect proximity.

Referring momentarily to FIG. 16, a flexible PCB 180 of two layers has a first side 181 and a second side 182, with the first side 181 having a conductive layer 181L and a nonconductive cover 181O, and the second side having a conductive layer 182L and a nonconductive cover 182C. In some embodiments, the flexible PCB 180 is a two-layer circuit board having a first side 181 and a second side 182, each side comprising a conductive layer 181L,182L formed on a flexible substrate 185, for example without limitation a polyimide flexible substrate. Each conductive layer may be formed or etched into different patterns. Each conductive layer may further be covered with a nonconductive cover layer 181C,182C which protect the conductive layers and prevents them from shorting against other conductive components inside the stylus.

Now please refer to FIG. 8 through FIG. 16, which show a flexible PCB 180 having multiple sensors laid out upon it.

In some embodiments, the slide sensor 140 and proximity sensor or sensors 130 are formed on a single flexible PCB 180. In some embodiments (not shown), the slide sensor and proximity sensor or sensors may be formed on separate flexible PCBs.

In some embodiments, the slide sensor 140 and proximity sensor or sensors 130 are formed on different sides of the flexible PCB 180 and in different regions from each other. For example, the slide sensor 140 is formed on conductive layer 181L in region 180R1, while the proximity sensor or sensors 130 are formed on conductive layer 182L in region 180R2. The slide sensor 140 comprises two electrodes 140E1,140E2 and a ground electrode 140G to help isolate the electrodes 140E1,140E2 from outside interference. The proximity sensor 130A comprises an electrode 130AE and a ground electrode 130AG; the proximity sensor 130B comprises an electrode 130BE and a ground electrode 130BG. All ground electrodes may be tied together to a common ground (not shown). Each electrode 140E1,140E2,130AE,130BE is separately electrically coupled by traces (not shown) on the flexible PCB 180 to a controller 116 on the circuit board 110, said controller of which manages the capacitive sensing electrodes. The common-tied ground electrodes 130AG,130BG,140G are also, as a group, electrically coupled by traces either to the controller 116 or simply to the overall circuit ground.

In some embodiments (not shown), ground planes may be formed on the opposing layer of the flexible PCB to further isolate the electrodes from electrical noise generated by the stylus.

By forming these regions on the same flexible PCB 180 but in different regions 180R1,180R2 of the flexible PCB 180, costs are reduced and assembly is simplified.

Referring now to FIGS. 4-7, in some embodiments, positioning the proximity sensor or sensors 130 and slide sensor 140 against an interior surface of the stylus barrel 10 is performed by a novel three-dimensional wrapping of the flexible PCB 180 around the chassis 120. The flexible PCB 180 is attached to the circuit board 110 both mechanically and electrically, with the contact pads (not shown) for the traces leading to the electrodes of the proximity sensor or sensors 130 and the slide sensor 140 soldered or otherwise electrically coupled to the appropriate contact pads (not shown) on the circuit board 110. The chassis 120 may be formed of two parts, upper chassis 120A and lower chassis 120B. The upper chassis 120A and lower chassis 120B sandwich the assembled combination of the circuit board 110 and flexible PCB 180.

The region 180R2 is wrapped around the lower chassis 120B such that the layer 182L is positioned proximally to the lower chassis 120B and the layer 181L is positioned proximally to the barrel 10 of the stylus 1.

The region 180R1 is wrapped around the upper chassis 120A such that the layer 181L is positioned proximally to the upper chassis 120A and the layer 182L is positioned proximally to the barrel 10 of the stylus 1.

Optionally, adhesive applied to the flexible PCB 180 on at least the edges of the sensor regions, holds the wrapped portions to the chassis 120 for ease of assembly and to ensure that the positions of the slide sensor 140 and proximity sensor or sensors 130 are maintained.

When assembled, the barrel 10 surrounds the chassis 120, circuit board 110, slide sensor 140, and proximity sensor or sensors 130. A cosmetic button 30 is positioned to protrude through a slot 11 in the barrel 10 and rests against the slide sensor 140; in some embodiments, the upper chassis 120A comprises a hinged segment 121A such that when the cosmetic button 30 is pressed, it presses the slide sensor 140 portion of the flexible PCB 180 against the hinged segment 121A and the inward force is applied to a switch 113 (see FIG. 3) on the circuit board 110; the hinged segment 121A may optionally be slightly taller than the chassis 120A to facilitate its motion. Similar structures are well known in the art and may be substituted. The switch 113 may in some embodiments be a bistate dome switch. The flexible PCB 180 and its conductive layers 181L,182L are protected by the nonconductive cover layers 181C,182C from being damaged. In some embodiments, the barrel 10 is made of a nonconductive material so that the proximity sensor or sensors 130 and slide sensor 140 are not shielded from external capacitive influences. In some embodiments, the barrel 10 is nonmonolithic and may optionally contain conductive materials in areas located away from the proximity sensor or sensors 130 and slide sensor 140.

In some embodiments, a plurality of cosmetic buttons 30 and the associated mechanical and electrical components may be used to provide additional button features.

In some embodiments, the circuit board 110 of the stylus 1 may comprise additional sensors, for example but not limited to a three-axis accelerometer 114.

In use, the stylus 1 having a slide sensor 140 may be used in a variety of ways. In communication with a tablet via the communications subcircuit 112, the stylus transmits data to the tablet including tip force, tip contact, button presses, proximity sensor level or levels, and slide sensor level. In some embodiments, the optional accelerometer data from the optional accelerometer 114 is also transmitted to the tablet. The accelerometer 114 is preferably configured to generate a triplet of the detected force in each axis as a triplet of floating-point numbers in the range [−1,1]. Intermediary software on the tablet, either in the operating system or in a helper application layer or in an application-level API, may use these data to provide a variety of new functions associated with the stylus.

In some embodiments, the controller 116 is configured to generate a numerical slide position whenever sufficient capacitive load is detected by the slide sensor 140. In some embodiments, the controller 116 generates a range value for the slide sensor in the range between 0 to 255 inclusive, usually noted as [0,255]. In some embodiments, the controller 116 is configured to generate a separate numerical value for the capacitance level detected by each proximity sensor of the one or more proximity sensors 130. In some embodiments, the controller generates a range value for each proximity sensor in the range [0,255].

There are many use cases for a stylus with slide sensor and proximity sensors. When communicating with an electronic device, even if that device does not have a touchscreen, the slide sensor can be used as a scroll control, and the slide sensor and proximity sensor or sensors and the physical buttons can all be used as inputs. When the electronic device does have a touchscreen, the slide sensor can add a third dimension of control to the X-Y control dimensions of the screen.

We claim as our invention:

1. A stylus, the stylus comprising:
    a barrel having an exterior surface and an interior surface;
    a chassis-having an upper chassis and a lower chassis disposed within the barrel;
    a plurality of proximity sensors configured to output a plurality of proximity data according to a presence or absence of touch or touches on the plurality of proximity sensors;
    a slide sensor configured to output a gradient datum according to a position of a touch on the slide sensor;
    a circuit board comprising a communications subcircuit; and
    a two-layer flexible PCB having a first side facing in a first direction and a second side facing in a second direction opposite to the first direction and a first region and a second region different from the first region, the two-layer flexible PCB mounted to the circuit board,
    wherein the slide sensor is formed on the first side and first region of the two-layer flexible PCB, and the proximity sensor is formed on the second side and second region of the two-layer flexible PCB, and
    wherein the first region of the two-layer flexible PCB is wrapped around the upper chassis such that the second side of the first region is positioned proximally to the upper chassis and the first side of the first region is positioned proximally to the interior surface of the barrel, and the second region of the two-layer flexible PCB is wrapped around the lower chassis such that the first side of the second region is positioned proximally to the lower chassis and the second side of the second region is positioned proximally to the interior surface of the barrel.

2. The stylus of claim 1, wherein when the slide sensor outputs a gradient datum according to a position of a touch on the slide sensor, then the communications subcircuit transmits the gradient datum.

3. The stylus of claim 1, wherein when the plurality of proximity sensors outputs the plurality of proximity data according to the zero or more touches on the proximity sensor, then the communications subcircuit transmits the proximity data.

4. The stylus of claim 1, further comprising a tactile switch assembly, the tactile switch assembly comprising a cosmetic button,
    wherein the cosmetic button is made of a nonconductive material and is disposed along and through a side of the barrel, and
    wherein the slide sensor is disposed longitudinally within the barrel and underneath the cosmetic button.

5. The stylus of claim 4, wherein the upper chassis further comprises a hinged segment, the tactile switch assembly further comprises a switch, and the switch is disposed on the circuit board,
    wherein when force is applied to the cosmetic button, the force is transmitted through the slide sensor to the hinged segment of the upper chassis, and then to the switch.

6. A stylus, the stylus comprising:
    a barrel having an exterior surface and an interior surface;
    a chassis having an upper chassis and a lower chassis disposed within the barrel;

a proximity sensor configured to output a proximity datum according to a presence or absence of touch on the proximity sensor;
a slide sensor configured to output a gradient datum according to a position of a touch on the slide sensor;
a circuit board comprising a communications subcircuit; and
a two-layer flexible PCB a first side facing in a first direction and a second side facing in a second direction opposite to the first direction and a first region and a second region different from the first region, the two-layer flexible PCB mounted to the circuit board,
where wherein the slide sensor is formed on the first side and first region of the two-layer flexible PCB, and the proximity sensor is formed on the second side and second region of the two-layer flexible PCB, and
wherein the first region of the two-layer flexible PCB is wrapped around the upper chassis such that the second side of the first region is positioned proximally to the upper chassis and the first side of the first region is positioned proximally to the interior surface of the barrel, and the second region of the two-layer flexible PCB is wrapped around the lower chassis such that the first side of the second region is positioned proximally to the lower chassis and the second side of the second region is positioned proximally to the interior surface of the barrel.

7. The stylus of claim 6, wherein when the slide sensor outputs a gradient datum according to a position of a touch on the slide sensor, then the communications subcircuit transmits the gradient datum.

8. The stylus of claim 6, wherein when the proximity sensor outputs a proximity datum according to a position of a touch on the proximity sensor, then the communications subcircuit transmits the proximity datum.

9. The stylus of claim 6, further comprising a tactile switch assembly, the tactile switch assembly comprising a cosmetic button,
wherein the cosmetic button is made of a nonconductive material and is disposed along and through a side of the barrel, and
wherein the slide sensor is disposed longitudinally within the barrel and underneath the cosmetic button.

10. The stylus of claim 9, wherein the upper chassis further comprises a hinged segment, the tactile switch assembly further comprises a switch, and the switch is disposed on the circuit board,
wherein when force is applied to the cosmetic button, the force is transmitted through the slide sensor to the hinged segment of the upper chassis, and then to the switch.

* * * * *